(12) United States Patent  (10) Patent No.: US 7,948,898 B2
Mengerink  (45) Date of Patent: May 24, 2011

(54) METHOD AND SYSTEM TO EFFICIENTLY MANAGE A NETWORK CONNECTION TO CONNECT A CLIENT AND A RESOURCE

(75) Inventor: Matthew Mengerink, San Jose, CA (US)

(73) Assignee: eBay Inc., San Jose, CA (US)

( * ) Notice: Subject to any disclaimer, the term of this patent is extended or adjusted under 35 U.S.C. 154(b) by 457 days.

(21) Appl. No.: 12/049,768

(22) Filed: Mar. 17, 2008

(65) Prior Publication Data

US 2008/0222297 A1  Sep. 11, 2008

Related U.S. Application Data

(63) Continuation of application No. 10/863,646, filed on Jun. 7, 2004, now Pat. No. 7,369,505.

(51) Int. Cl.
*H04J 1/16* (2006.01)
*H04L 12/56* (2006.01)

(52) U.S. Cl. ........ 370/237; 370/238; 370/252; 370/254; 709/203

(58) Field of Classification Search .................. 370/237, 370/238, 252, 254; 709/203
See application file for complete search history.

(56) References Cited

U.S. PATENT DOCUMENTS

| | | | |
|---|---|---|---|
| 6,128,280 A | 10/2000 | Jamoussi et al. | |
| 7,096,367 B2 | 8/2006 | Garg et al. | |
| 7,369,505 B2 | 5/2008 | Mengerink | |
| 7,401,152 B2 * | 7/2008 | Traversat et al. | 709/230 |
| 7,551,563 B2 * | 6/2009 | Beadle et al. | 370/238 |
| 2002/0015403 A1 | 2/2002 | McConnell et al. | |
| 2005/0030955 A1 | 2/2005 | Galin et al. | |
| 2005/0078660 A1 * | 4/2005 | Wood | 370/352 |
| 2005/0286532 A1 | 12/2005 | Mengerink | |

OTHER PUBLICATIONS

"U.S. Appl. No. 10/863,646, Response filed Nov. 7, 2007 to Non-Final Office Action mailed Aug. 7, 2007", 12 pgs.
"U.S. Appl. No. 10/863,646, Notice of Allowance mailed Dec. 20, 2007", NOAR, 8 pgs.

* cited by examiner

*Primary Examiner* — John Pezzlo
(74) *Attorney, Agent, or Firm* — Schwegman, Lundberg & Woessner, P.A.

(57) ABSTRACT

This document discusses, among other things, an example system and methods for connecting a client and a resource. Example embodiments may include receiving a request from a client computer, for a connection to a generically named resource that is associated with multiple resources. In response to the request, example embodiments may further include detecting whether one of the multiple resources is overloaded and determining a number of static connections reserved for the client computer. A static or dynamic connection may be assigned to the resource or a further one of the multiple resources based on the generic resource name, the load on the resource and the number of static connections reserved for the client computer.

25 Claims, 9 Drawing Sheets

METHOD AND SYSTEM TO EFFICIENTLY MANAGE A NETWORK CONNECTION TO CONNECT A CLIENT AND A RESOURCE

RELATED APPLICATIONS

The present application is a continuation of U.S. patent application Ser. No. 10/863,646 filed on Jun. 7, 2004 now U.S. Pat. No. 7,369,505 and entitled "METHOD AND SYSTEM TO EFFICIENTLY MANAGE A NETWORK CONNECTION TO CONNECT A CLIENT AND A RESOURCE", which application is incorporated herein by reference in its entirety.

FIELD OF THE INVENTION

One embodiment relates generally to the technical field of computer networks, and to methods and systems to efficiently manage connections that are used to connect computer systems.

BACKGROUND

Computer networks connect computer systems in a network. One type of connection is a static connection, as illustrated in FIG. 1. A static connection typically includes a dedicated point-to-point connection between the computer systems. The static connection remains established until it is removed by configuration changes. An alternate method is by a dynamic connection, as illustrated in FIG. 2. A dynamic connection is typically established between computer systems only when the nodes request a communication session.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
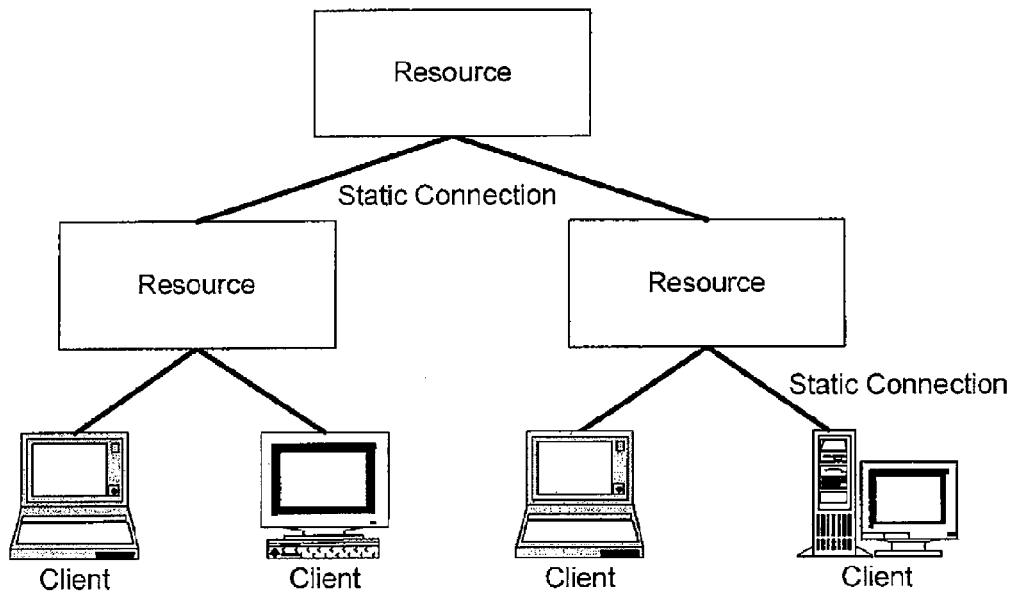
FIG. 1 is a network diagram of a prior art approach to connecting a client and a resource by static connections.
Figure 2:
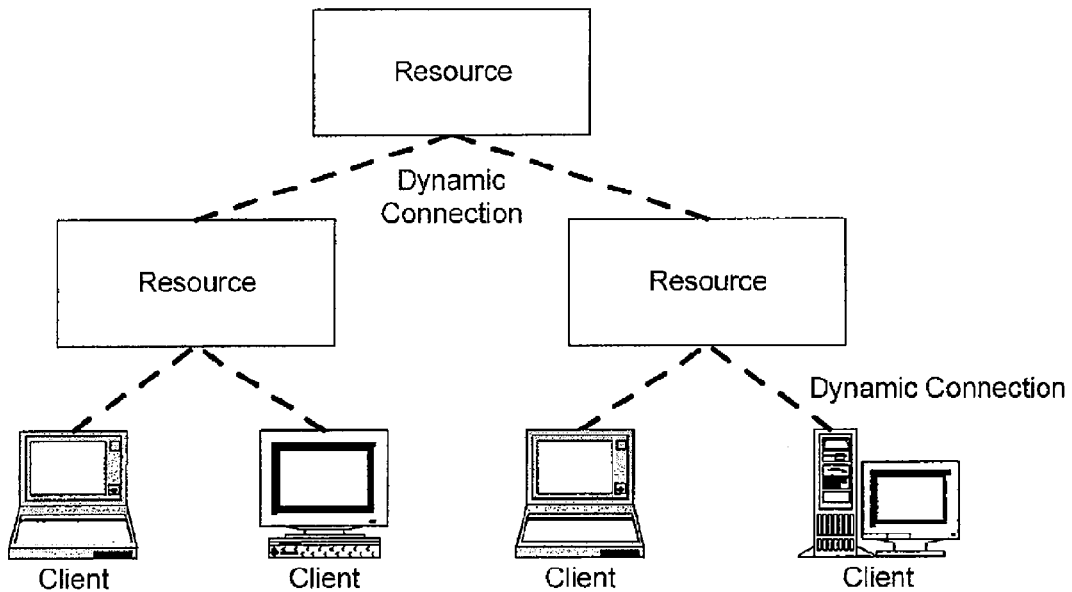
FIG. 2 is a network diagram of a prior art approach to connecting a client and a resource by dynamic connections.
Figure 3:
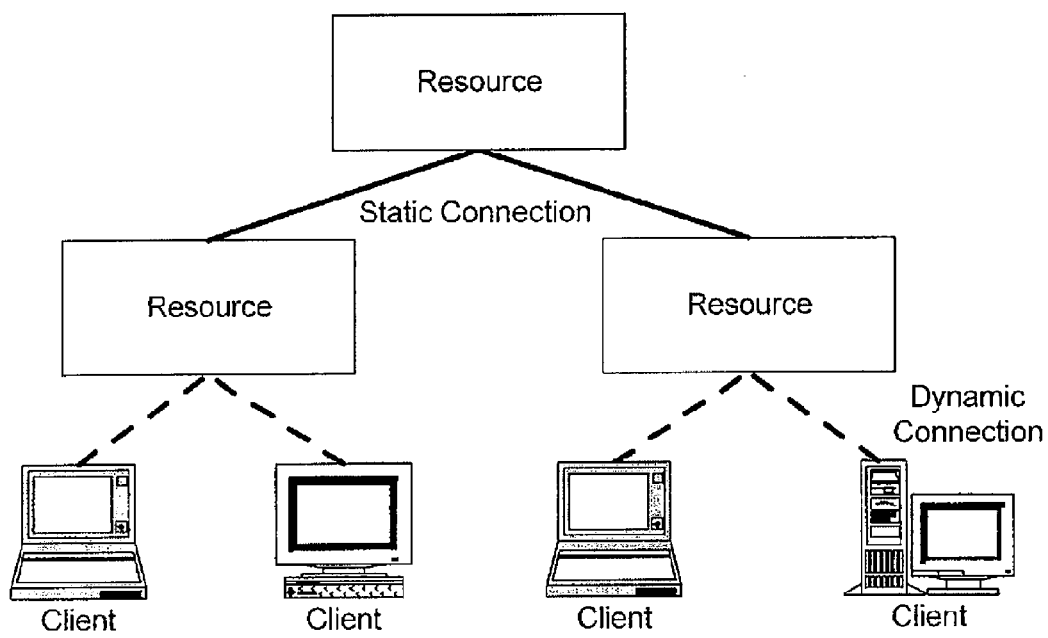
FIG. 3 is a network diagram of a prior art approach to connecting a client and a resource by a hybrid model of static and dynamic connections.
Figure 4:
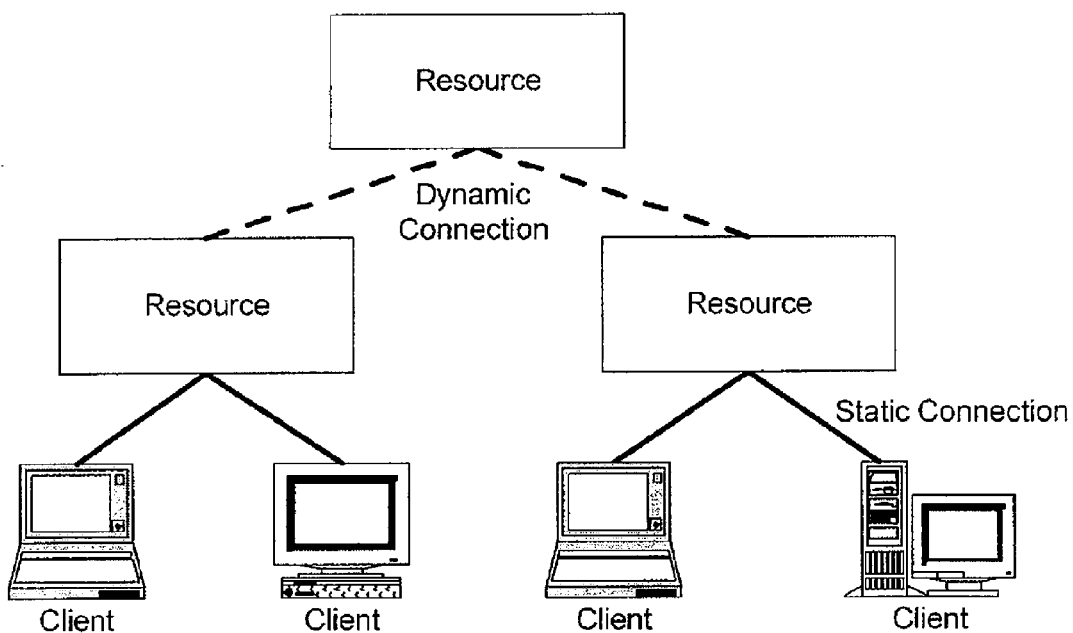
FIG. 4 is a network diagram of a prior art approach to connecting a client and a resource by a hybrid model of static and dynamic connections.

A method and system to allocate connections between computer systems in a network are disclosed herein. In the following description, for the purposes of explanation, numerous specific details are set forth in order to provide a thorough understanding of the present invention. It will be apparent, however, to one skilled in the art that the present invention may be practiced without some of the specific details.

As will be described in greater detail below, an embodiment of the present invention provides for establishing connections over a network between computer systems, such as a client and a resource. Advantageously, an embodiment of the present invention is able to determine the type of connection, namely static and dynamic, to be provided for a system. The assignment of the static and dynamic connections may be dynamically changed, based on the demand for the connections and the characteristics of the network. The characteristics of the network include, but are not limited to, the availability, accessibility and load performance of network paths, communication entities and destination systems.

In one embodiment of the present invention, a static connection is first assigned to a client if it is available. Utilizing a static connection may improve the overall efficiency of the network as it does not require connections to be reestablished and, therefore, may reduce the processing time. In addition, the present invention computes the maximum number of static connections reserved for each client based on the demand for the connections. Hence, even if a static connection is available, the client may be assigned a dynamic connection rather than a static connection if it has already depleted its static connections reserve. This seeks to provide a fair assignment of static connections for each client.

In another exemplary embodiment, the present invention includes the capability of redirecting a network connection request to a backup resource in the event that the primary resource is unable to serve the request.

In one embodiment, the operations described herein may be embodied, at least partially, in machine-executable instructions. The instructions can be used to cause a general-purpose or special-purpose processor, which is programmed with the instructions, to perform the operations of the present invention. Alternatively, the operations described herein may be performed by specific hardware components that contain hardwired logic for performing the operations, or by any combination of programmed computer components and custom hardware components.

An embodiment may be provided as a machine-readable computer medium having stored thereon a computer program comprising instructions that may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, i.e. magnet or optical cards, or other types of media/machine-readable media suitable for storing electronic instructions. Moreover, an embodiment may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Importantly, while embodiments of the present invention will be described with respect to a networking environment, the method and system described herein are equally relevant to other electronic and computing environments in which connections are assigned. For example, it is envisioned that the present invention could be implemented in a multi-processor computing system.

Connection Manager Overview

Figure 5:
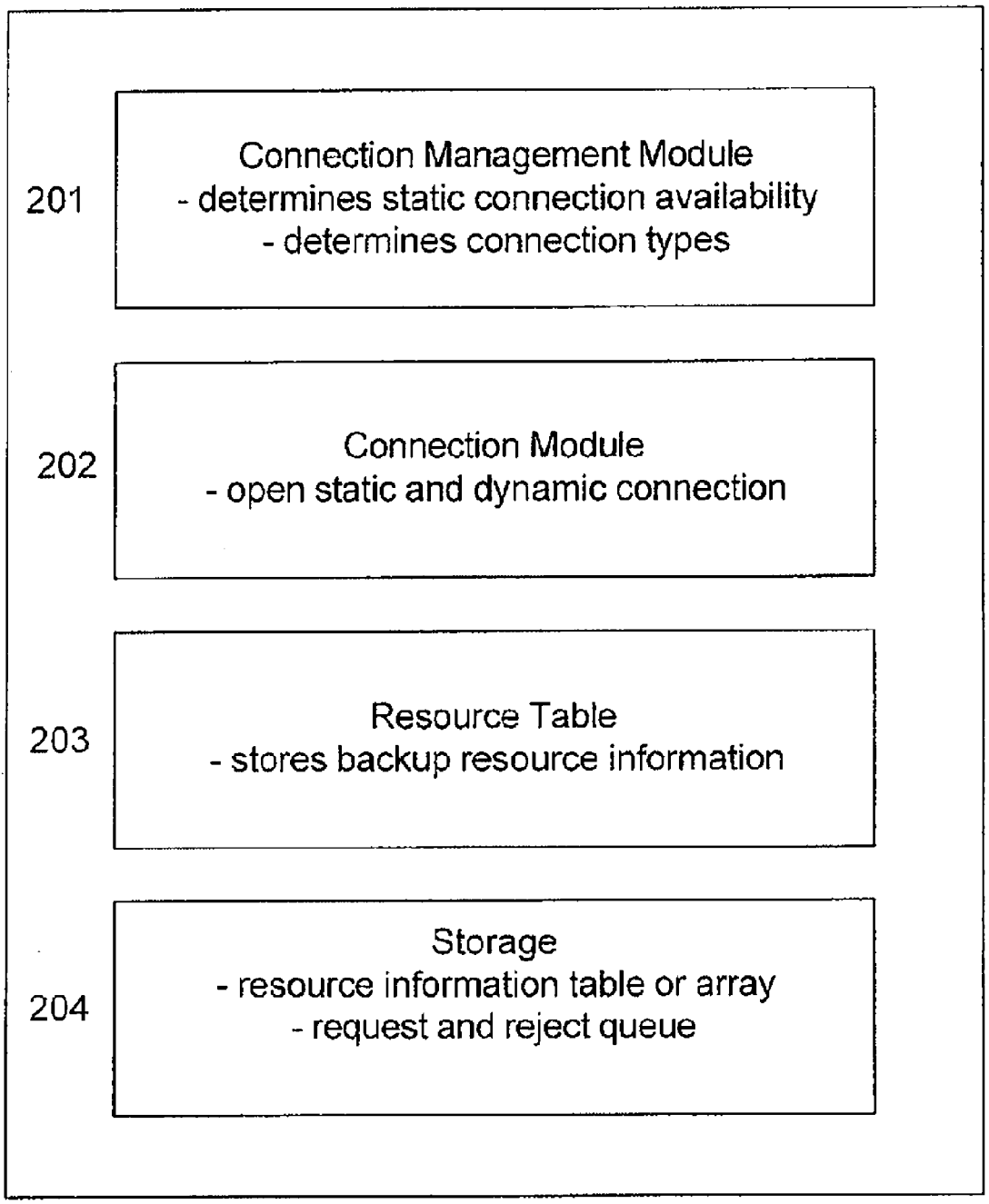
FIG. 5 is a block diagram of an exemplary embodiment of the present invention.
Figure 6:
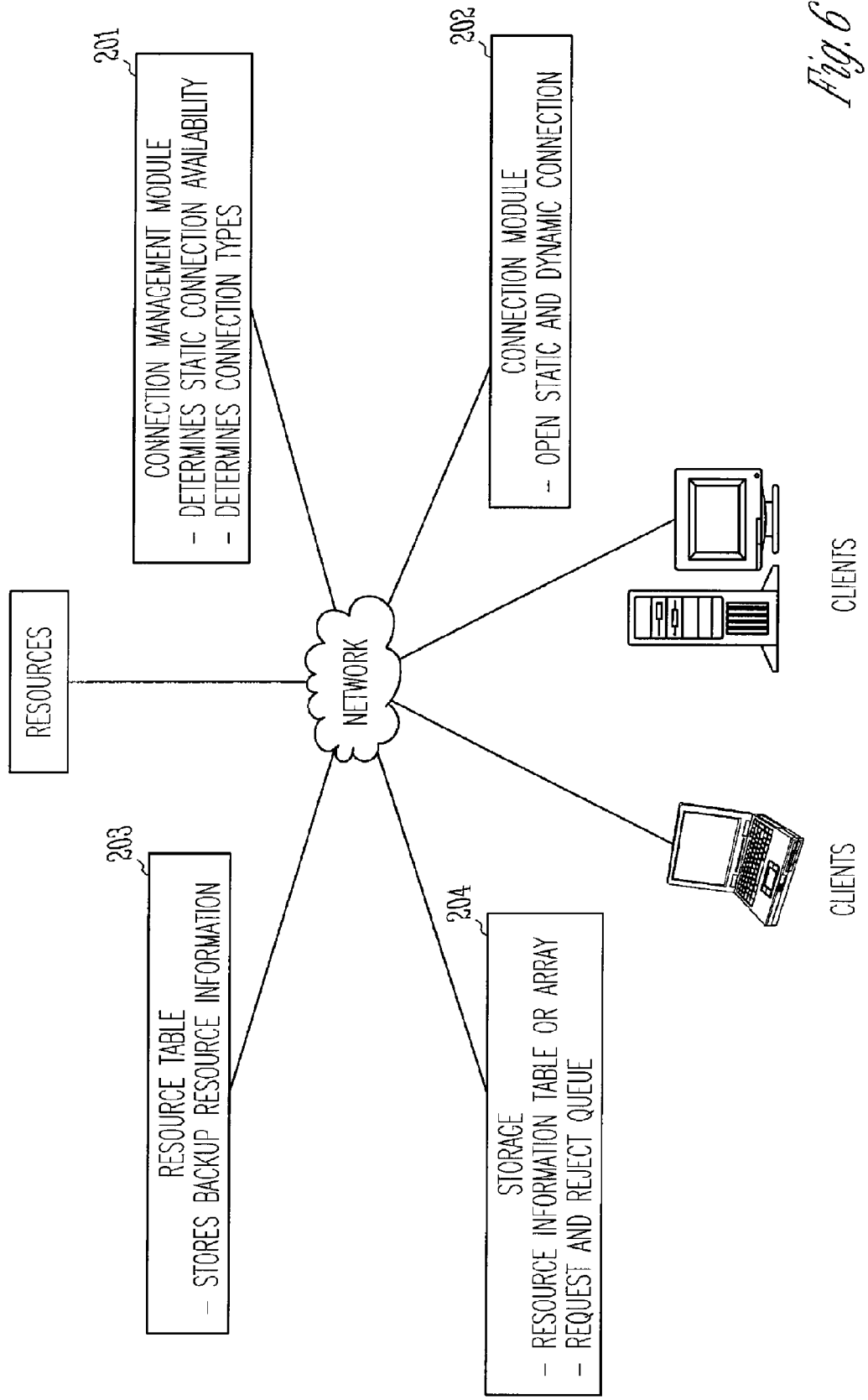
FIG. 6 is a network diagram of an exemplary environment in which the invention may be practiced.

FIGS. 5, 6 and the discussion herein are intended to provide a description of an exemplary approach to determining a connection for a client. Various embodiments provide different methodologies for manipulating the network data elements and the relationships among the various systems to derive connections for connecting a client to a resource.

FIG. 5 illustrates an exemplary embodiment 200 of a connection manager, further illustrating embodiments of elements 201-204. The connection manager 200 is comprised of a connection management module 201, a connection module 202, a resource table 203 and storage 204.

The connection management module 201 functions to determine the availability of connections and the connection types. It computes the number of static connections reserved for the client based on the number of connection requests and the status of the network. The computation may be performed on real-time data or historical data.

In one example, the connection management module 201 obtains the network information by polling the network system. Alternatively, the connection management module 201 receives the network information broadcasted by the systems in the network.

In addition, the connection management module 201 is able to redirect a connection request to a backup resource in the event that the primary resource is unavailable. The connection management module 201 may perform a look-up in the resource table 203 to determine if a backup resource is available. Similarly, when a primary resource is overloaded, the connection management module 201 may redirect the connection request to a backup resource.

The connection module 202 is responsible for opening a static connection or a dynamic connection with the resource. The connection manager 200 also includes storage for storing the resource table 203, queue information and network process information.

FIG. 6 is a network diagram of an exemplary environment in which an embodiment of the present invention may be practiced. In this embodiment, elements 201-204 of the connection manager 200 reside on different machines or at different physical locations in the network. It will be appreciated by one skilled in the art that elements 201-204 may also reside on different virtual locations.

The connection manager 200 is able to replace elements 202-204 with other resources in the network that accomplish the same function. In one example, if there exists a resource table that contains information of backup resources, the connection manager 200 is able to perform lookup on this resource table instead of its own table 203. In another example, a client may have the capability to open a connection directly with the resource. Therefore, connection manager 200 may inform the client of the type of connection assigned and the client opens a connection directly with the resource. The connection module 202 is not required in this case.

Network Architecture Overview

Figure 7:
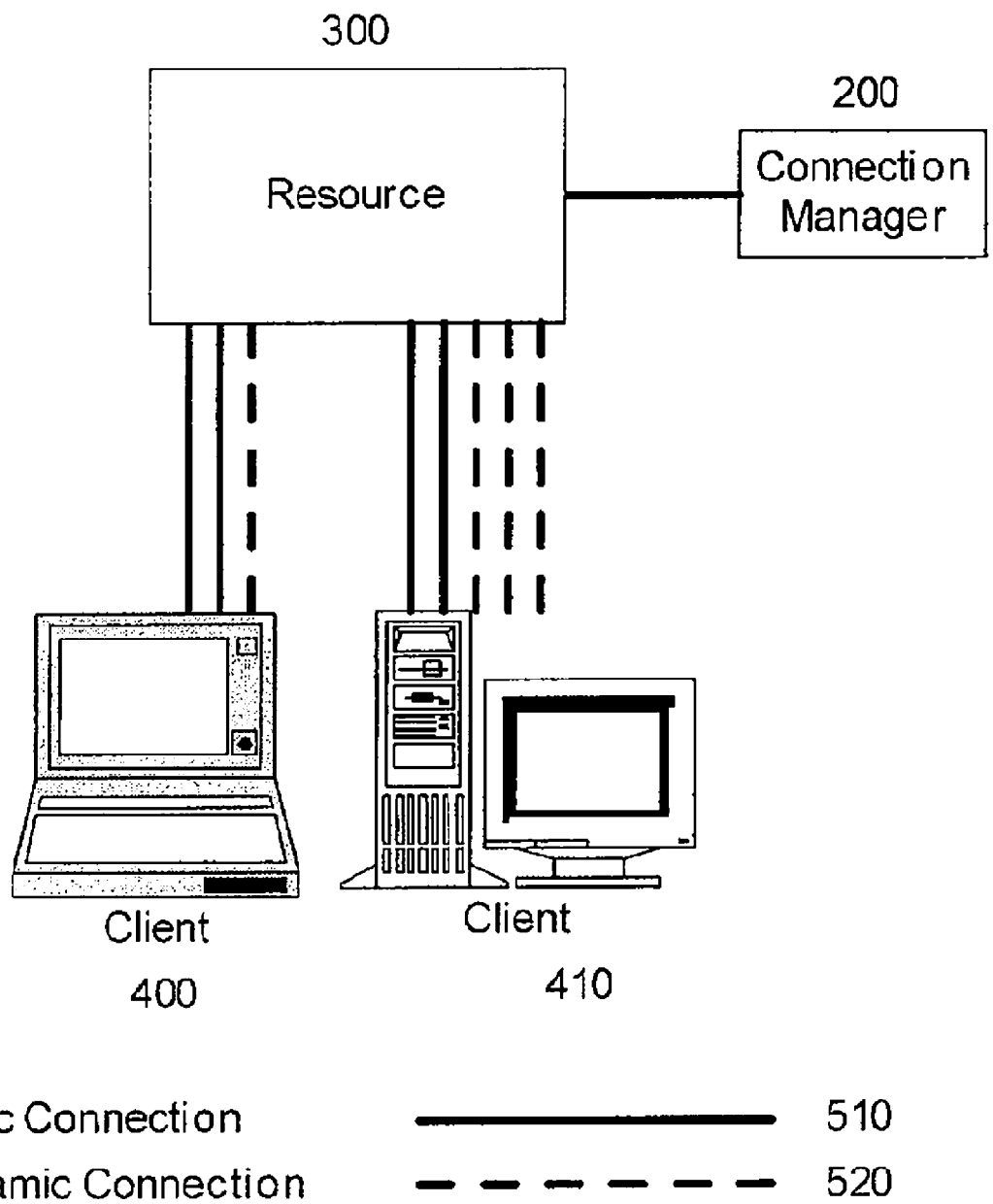
FIG. 7 is a network diagram of an embodiment that provides static and dynamic connections according to one embodiment of the present invention.
Figure 8:
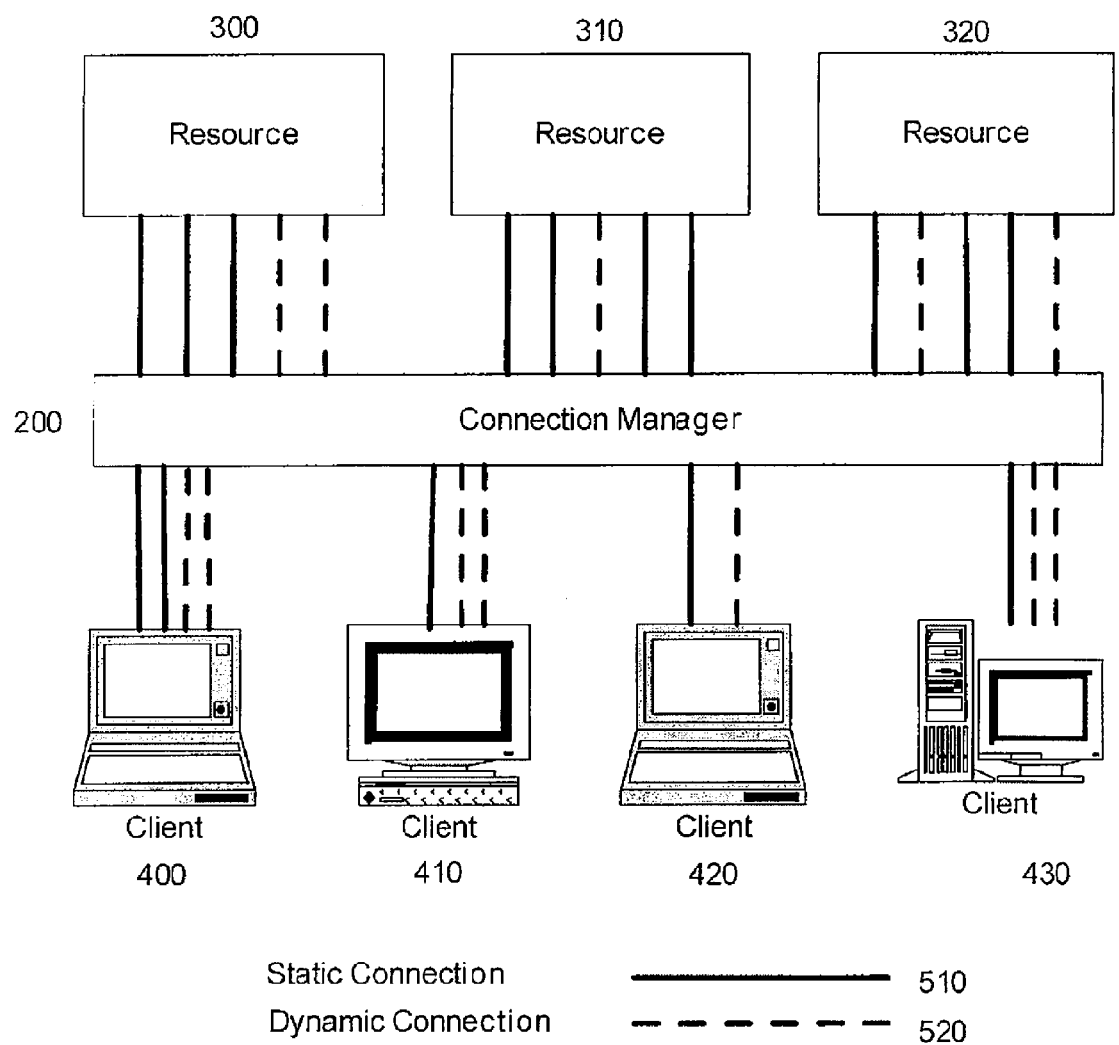
FIG. 8 is a network diagram of an exemplary embodiment to connect clients to multiple resources.
Figure 9:
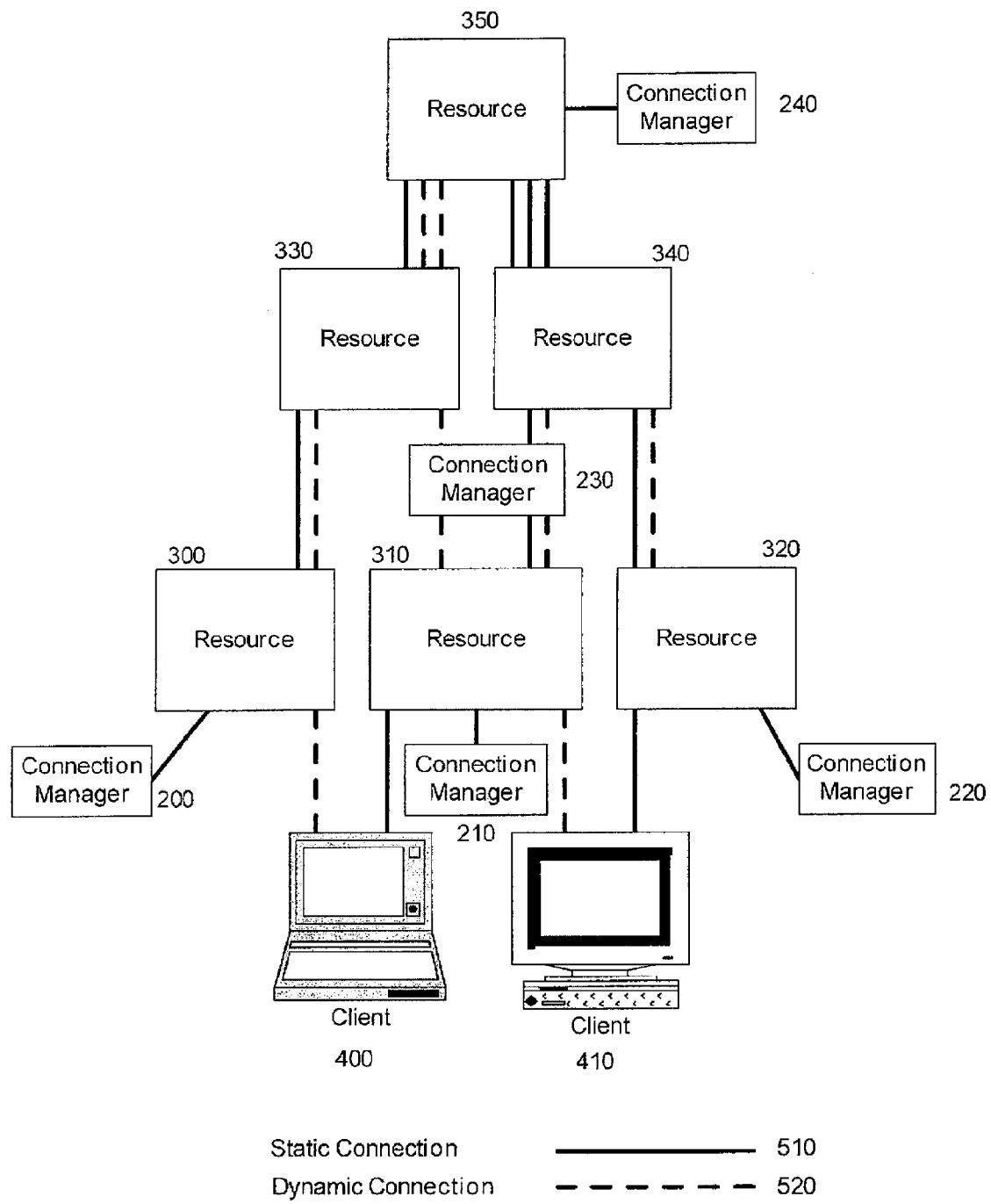
FIG. 9 is a network diagram of an exemplary embodiment of a network design wherein an embodiment of the present invention may be practiced with some degree of fault tolerance.

It is to be understood that the network configurations and interconnections shown in FIGS. 7-9 and described herein, are provided for purpose of illustration only. One of ordinary skill in the art will readily appreciate that the present invention may be practiced on networks more or less complex than that shown, in accordance with the teachings contained herein.

Illustrated in FIG. 7 are a connection manager 200, a resource 300, client computers 400, 410, static connections 510 and dynamic connections 520. In an embodiment, the client computers 400 and 410 communicate with the resource 300, which is a server computer (or a plurality of computers).

A client computer 400 may comprise a standard computer platform or a specialized computer platform, including, but not limited to a desktop computer, a laptop computer, personal data assistant, and a handheld computer. A number of client computers 400 may be supported by the invention. In an embodiment, the client computers 400 may each comprise a processor, memory, storage devices, a network interface, and a display, which are electrically coupled via buses. A network interface is connected to a communication network (e.g., one or more networks, including, but not limited to the Internet, private or public telephone, cellular, wireless, satellite, cable, local area, metropolitan area and/or wide area networks). Additionally, a client computer, communication network, and server computer could be implemented in a single computer platform, with the communication network being an internal information sharing mechanism such as message passing or shared memory.

The resource 300 is, in the exemplary embodiment, a server computer which may comprise one or more standard computer platforms or specialized computer platforms (e.g., a computer platform optimized for retrieving information and sending information to clients), including, but not limited to one or more desktop computers, servers, mainframes, laptop computers, handheld computers, and personal data assistants. For simplicity, only one server computer is depicted. However, a number of server computers may be utilized. When the invention is used in conjunction with a wide geographic area such as over the Internet, typically numerous client computers and numerous serving computers are used. When a plurality of serving computers is used, they can be co-located, or distributed across the communication network.

In another embodiment of the invention, the client computers 400, 410 and the resource 300 are computer equipments, for example, for the purpose of communications.

In FIG. 7, the client computer 400 makes a request to connect to the resource 300. The connection manager 200 processes the request to determine if the resource is able to provide a static connection 510. If the static connections 510 reserved for client 400 are fully utilized, the connection manager 200 assigns a dynamic connection 520 to the client computer 400. In another example, the static connections 510 reserved for client 410 are available, therefore, the client computer 510 is assigned a static connection by the connection manager 200.

FIG. 8 depicts another network setup, according to an embodiment of the present invention. In this embodiment, the connection manager 200 manages the connection requests for the resources 300, 310 and 320, and acts as a centralized connection management system. Resources 300, 310 and 320 are backup systems for each other.

In an example, the network is set up such that the client computer may make a request connection to a generic resource name. The client computer may be unaware of the multiple resources 300, 310 and 320 associated with the generic resource name. When a client computer 400 makes a request for connection, the connection manager 200 determines the number of static connections reserved for the client computer 400 based on the total requests for the pool of resources 300, 310, 320 by other clients, and also the network status. If the network status reflects that resource 300 is overloaded, the connection manager 200 seeks to assign a connection from resources 310 and 320. The connection manager 200 assigns a static connection 510 to the client computer 400, if the static connections reserved for the client 400 are available.

In another example, the network is setup such that the client computer 400 is only aware of the primary resource 300. Backup resources 310 and 320 are invisible to the client. When a client 420 makes a connection request to the resource 300, the connection manager 200 determines the number of static connections reserved for the client 420 based on the total requests for resources 300 by other clients and the network status. If resource 300 is not available, the connection manager 200 performs a look-up in the resource table 203 to determine if backup resources are available. In this case, the resource table 203 identifies backup resources 310 and 320. The connection manager 200 redirects the connection request to resource 310 and determines if a static connection 510 is available. It will be appreciated by one skilled in the art that different methods of allocating the request to a pool of resources may be applied.

FIG. 9 illustrates another network setup according to one embodiment of the present invention. In this exemplary embodiment, the resources comprise routers 300, 310, 320; telecommunication circuits of service provider A 330 and service provider B 340; and a World Wide Web server 350. The connection managers 200, 210 and 220 are dedicated to a single router, while connection manager 230 is a centralized system for routers 330 and 340.

In one example, when client computer 400 wants to access the World Wide Web server 350, it first makes a request to the router 300. The connection manager 200 of router 300 makes a determination as to whether the maximum number of static connections for client computer 400 has been exceeded. If not, a static connection is assigned to the client computer 400. Otherwise, the system will attempt to provide a dynamic connection. In this example, both static and dynamic connections are unavailable for client computer 400. The connection manager 200 performs a lookup in the resource table to verify the existence of a backup resource. If the backup resource, router 310, is available, the connection request is subsequently forwarded to the router 310. Similarly, the connection manager 210 of router 310 performs the same function of determining the type of connections to be assigned. In this case, a static connection is established between the client computer 400 and router 310.

Next, the router 310 makes a request to establish a connection with a service provider. The configuration in this example is such that the service provider A 330 and B 340 are transparent to the router 310. The router 310 makes a request to a generic resource name, which is associated with service provider A 330 and B 340. The connection manager 230 is a centralized management module for the service providers. It determines the maximum number of static connections reserved for the router 310 based on the total requests for the service providers by other routers 330 and 320, and the network status. A static connection from service provider B 340 is assigned to the router 310.

The next level of communication is between the service provider B 340 and the World Wide Web server 350. Similarly, the connection manager 250 determines the type of connections to be assigned to the World Wide Web server 350.

Connection Types Determination

Figure 10:
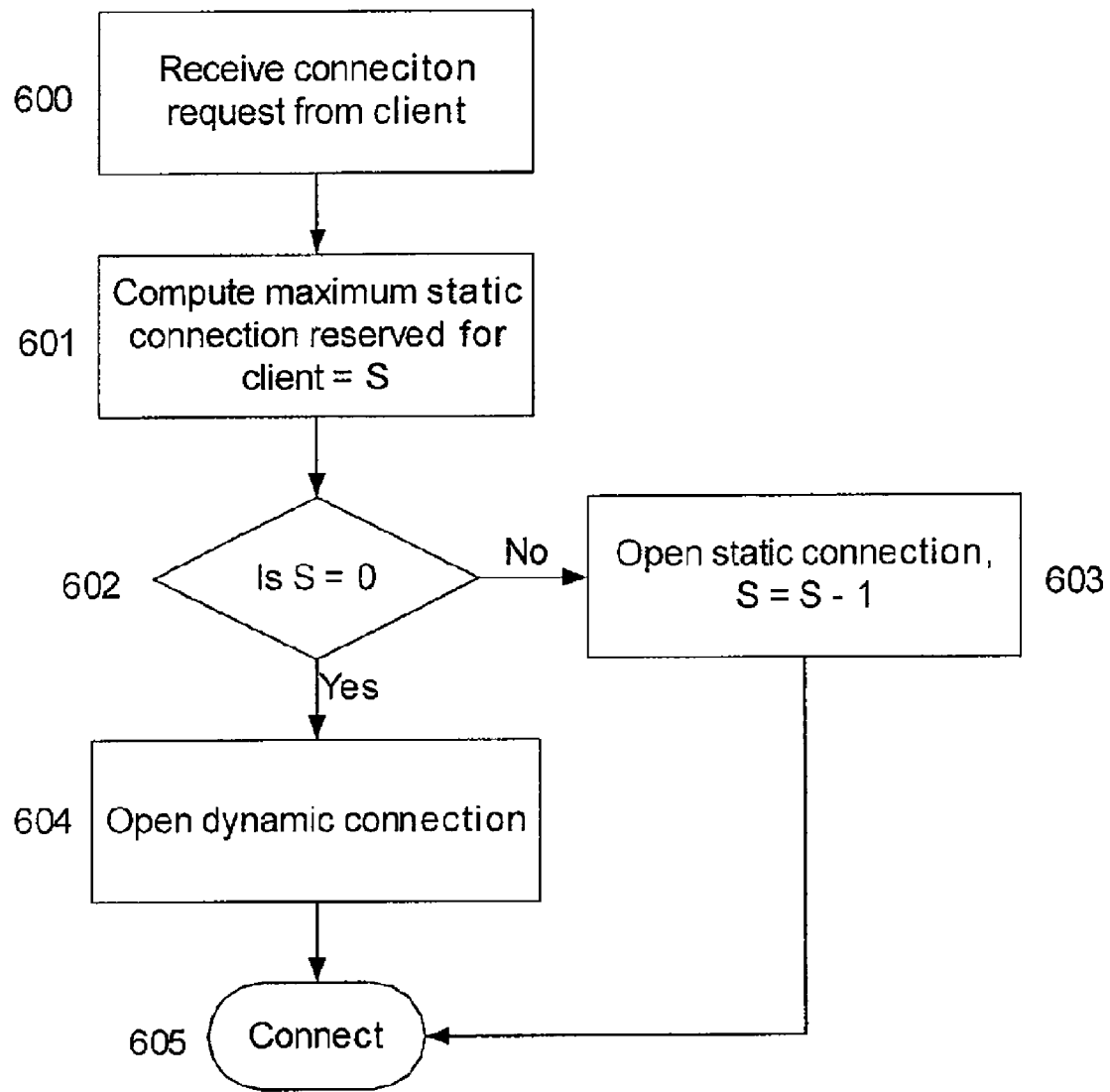
FIG. 10 is a flow chart that illustrates one embodiment of a process for establishing static and dynamic connections between computer systems over a network according to one embodiment of the present invention.
Figure 11:
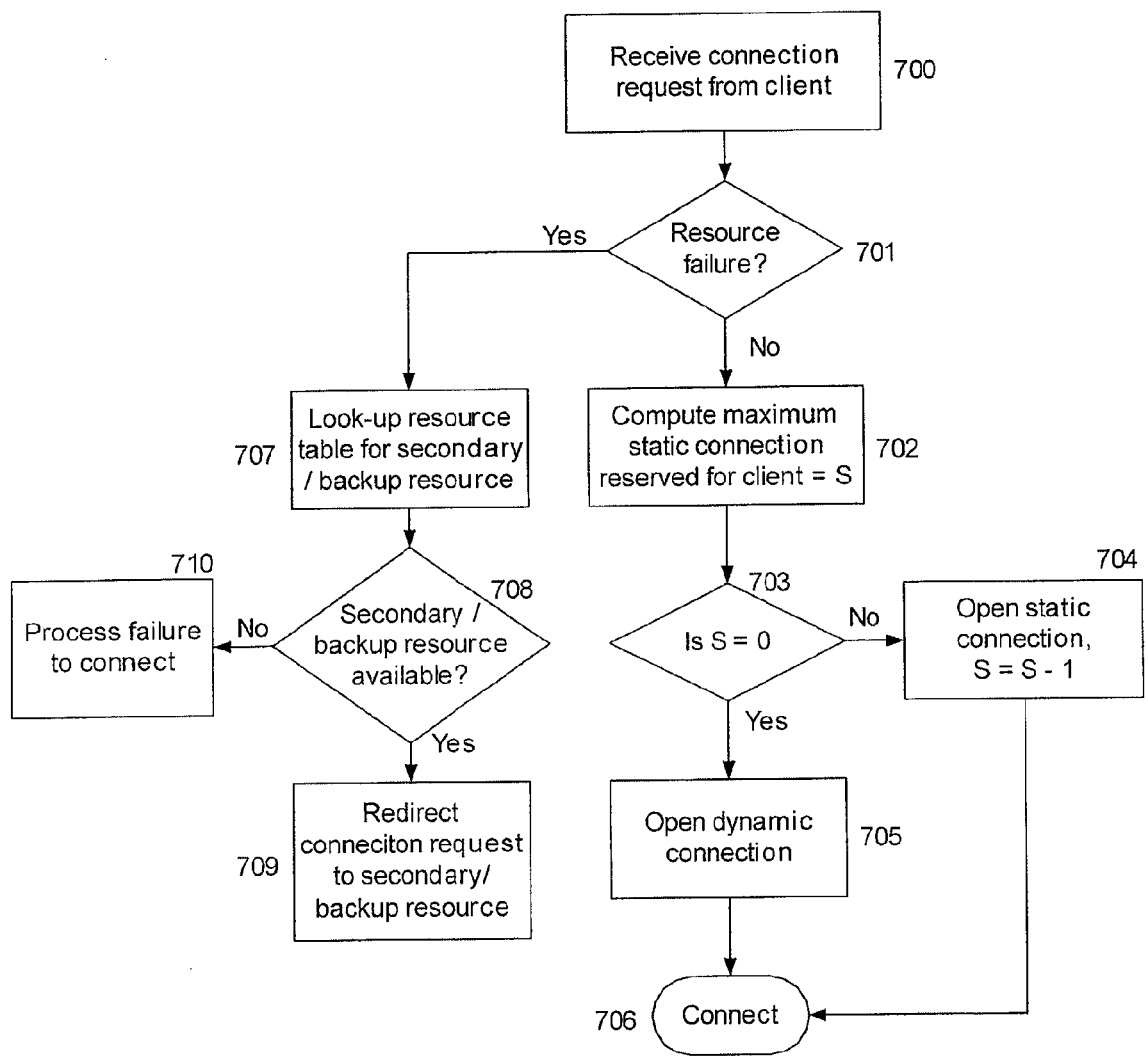
FIG. 11 is a flow chart that illustrates one embodiment of a process for establishing static and dynamic connections between computer systems with fault tolerance feature.

FIGS. 10 and 11 illustrate the flow diagrams describing an operation to determine a connection type for connecting a client to a resource, according to an embodiment of the present invention. The illustrative embodiment provides for variations and different flow diagrams and methodologies to be used in various embodiments to conform to design decisions in implementing the invention. Moreover, the illustrative embodiment could be embodied in any combination of software, hardware, firmware, etc. Furthermore, the illustrative embodiment provides for programming the functionality required for practicing the invention using any programming technology, paradigm, and/or language that exist today or may be developed in the future, including, but not limited to parallel programming, object-oriented technology, distributed processing, multi-processing, Java, C, C++, and assembly language.

FIG. 10 is a flow diagram illustrating a routine that may be performed by the connection manager 200 to determine a connection type for a client. The routine begins at operation 600, where the connection manager 200 receives a connection request from the client. It proceeds to operation 601 where the connection manager 200 computes the maximum number of static connections reserved for the client. If a static connection reserved for the client is still available, the connection manager 200 opens the static connection at operation 603, and establishes the connection at operation 605. However, if the static connections reserved for the client is fully utilized, it proceeds to operation 604 where a dynamic connection is opened and connected at operation 605.

FIG. 11 is a flow diagram illustrating a routine that may be performed by the connection manager 200 to determine the connection for connecting a client and a resource, in accordance to another exemplary embodiment of the present invention. This routine includes the capability to connect to the backup resources when required. The routine begins at operation 700, and proceeds to operation 701 to determine if the resource is available. If the resource is available, it continues to operation 702 where computation of the maximum static connections reserved for the client takes place. At operation 703, if a static connection reserved for the client is available, it proceeds to operation 704 where a static connection is opened. Otherwise, it proceeds to operation 705 to open a dynamic connection. At operation 706, the connection is then established. However, if at operation 701, a resource is detected to be unavailable, the next operation 707 consists of looking up a resource table to determine the availability of a secondary or backup resource. In operation 708, if the secondary or backup resource is determined to be available, the connection request is redirected to the secondary or backup resource at operation 709. Finally, if the secondary or backup resource is unavailable, the failure to connect is processed at operation 710.

In view of the many possible embodiments to which the principles of the current invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof.

What is claimed is:

1. A computer-implemented method comprising:
   using a processor to perform the operations of:
   receiving from a client computer, a request for a connection to a generic resource identifier associated with a plurality of resources; and in response to the request:
  detecting whether a network status reflects that a first resource of the plurality of resources is overloaded;
  determining a number of static connections reserved for the client computer; and
  assigning at least one of a static connection or a dynamic connection to at least one of the first or a second resource of the plurality of resources, based on:
    the generic resource identifier;
    whether the first resource is overloaded; and
    the number of static connections reserved for the client computer.

2. The computer-implemented method of claim 1, wherein the client computer is unaware of the plurality of resources associated with the generic resource identifier.

3. The computer-implemented method of claim 1, wherein the determining of the number of static connections reserved for the client computer is based on a total number of requests for connection to the plurality of resources, and on the network status.

4. The computer-implemented method of claim 3, wherein the determining of the number of static connections reserved for the client computer based the total number of requests for connection to the plurality of resources includes using real-time data.

5. The computer-implemented method of claim 1, wherein the detecting of whether the network status reflects that the first resource is overloaded includes at least one of polling a network system or receiving network information broadcasted by a system on the network.

6. The computer-implemented method of claim 1, wherein the assigning of the at least one of the static connection and the dynamic connection to the second resource is based on detecting that the first resource is overloaded.

7. The computer-implemented method of claim 6, wherein the assigning of the at least one of the static connection and the dynamic connection to the second resource is based on determining that one or more of the number of static connections reserved for the client computer is available.

8. The computer-implemented method of claim 6, wherein the assigning of the at least one of the static connection and the dynamic connection to the second resource is based on determining that one or more of the number of static connections reserved for the client computer is not available.

9. The computer-implemented method of claim 1, wherein the assigning of the at least one of the static connection and the dynamic connection to the first resource is based on detecting that the first resource is not overloaded.

10. The computer-implemented method of claim 9, wherein the assigning of the at least one of the static connection and the dynamic connection to the first resource is based on determining that one or more of the number of static connections reserved for the client computer is available.

11. The computer-implemented method of claim 9, wherein the assigning of the at least one of the static connection and the dynamic connection to the second resource is based on determining that one or more of the number of static connections reserved for the client computer is not available.

12. A system comprising:
  a connection manager configured to be executed by a processor and coupled between a client computer and a plurality of computer resources, the connection manager to receive from the client computer, a request for a connection to a generic computer resource identifier associated with the plurality of computer resources; and
  in response to the request, the connection manager to:
    detect whether a network status reflects that a first computer resource of the plurality of computer resources is overloaded;
    determine a number of static connections reserved for the client computer; and
    assign at least one of a static connection or a dynamic connection to at least one of the first or a second computer resource of the plurality of computer resources, based on:
      the generic computer resource identifier;
      whether the first computer resource is overloaded; and
      the number of static connections reserved for the client computer.

13. The system of claim 12, wherein the client computer is unaware of the plurality of computer resources associated with the generic resource identifier.

14. The system of claim 12, wherein the connection manager is to determine the number of static connections reserved for the client computer based on a total number of requests for connection to the plurality of computer resources, and on the network status.

15. The system of claim 14, wherein the connection manager is to use real-time data to determine the number of static connections reserved for the client computer.

16. The system of claim 14, wherein the connection manager is to detect whether the network status reflects that the first computer resource is overloaded via at least one of polling the network or via receiving network information broadcasted by a system on the network.

17. The system of claim 12, wherein the connection manager is to assign the at least one of the static connection and the dynamic connection to the second computer resource based on a detection that the first computer resource is overloaded.

18. The system of claim 17, wherein the connection manager is to assign the static connection to the second computer resource based on a determination that one or more of the number of static connections reserved for the client computer is available.

19. The system of claim 17, wherein the connection manager is to assign the dynamic connection to the second computer resource based on a determination that one or more of the number of static connections reserved for the client computer is not available.

20. The system of claim 12, wherein the connection manager is to assign the at least one of the static connection and the dynamic connection to the first computer resource based on a detection that the first computer resource is not overloaded.

21. The system of claim 20, wherein the connection manager is to assign the static connection to the first computer resource based on a determination that one or more of the number of static connections reserved for the client computer is available.

22. The system of claim 20, wherein the connection manager is to assign the dynamic connection to the first computer resource based on a determination that one or more of the number of static connections reserved for the client computer is not available.

23. A non-transitory machine-readable medium containing instructions which, when executed by a processing system, cause the processing system to perform a method, the method comprising:
  receiving from a client computer, a request for a connection to a generic resource identifier associated with a plurality of resources; and in response to the request:
    detecting whether a network status reflects that a first resource of the plurality of resources is overloaded;
    determining a number of static connections reserved for the client computer; and
    assigning at least one of a static connection or a dynamic connection to at least one of the first or a second resource of the plurality of resources, based on:
        the generic resource identifier;
        whether the first resource is overloaded; and
        the number of static connections reserved for the client computer.

24. The non-transitory machine-readable medium of claim 23, wherein the assigning of the at least one of the static connection and the dynamic connection to the second resource based on detecting that the first resource is overloaded.

25. A system comprising:
a manager means, using a processor, for receiving from a client computer, a request for a connection to a generic resource identifier associated with a plurality of resources; and
in response to the request:
    detecting whether a network status reflects that a first resource of the plurality of resources is overloaded;
    determining a number of static connections reserved for the client computer; and
    assigning at least one of a static connection or a dynamic connection to at least one of the first or a second resource of the plurality of resources, based on:
        the generic resource identifier;
        whether the first resource is overloaded; and
        the number of static connections reserved for the client computer.

* * * * *